United States Patent [19]

Frisch et al.

[11] Patent Number: 4,741,961
[45] Date of Patent: May 3, 1988

[54] POLYURETHANE-BASED ADHESIVE COATING OR FILM, AND USE OF SAME IN LAMINATED GLASS PANES

[75] Inventors: Kurt C. Frisch, Grosse Ile; Daniel Klempner, Farmington Hills, both of Mich.; Helmer Rädisch; Gerhard Holzer, both of Aachen, Fed. Rep. of Germany

[73] Assignee: Saint-Gobain Vitrage, Aubervilliers, France

[21] Appl. No.: 833,034

[22] Filed: Feb. 26, 1986

[30] Foreign Application Priority Data

Feb. 26, 1985 [FR] France .................................. 85 02741

[51] Int. Cl.$^4$ .............................................. B32B 27/36
[52] U.S. Cl. .................................. 428/412; 428/423.1; 428/425.6; 525/130; 525/415; 525/440; 525/462
[58] Field of Search .................. 428/412, 425.6, 423.1; 525/415, 920, 440, 462, 130; 528/75, 49

[56] References Cited

U.S. PATENT DOCUMENTS

| 4,197,219 | 4/1980 | Damico | 428/424.6 |
| 4,254,176 | 3/1981 | Müller et al. | 428/425.6 |
| 4,328,281 | 5/1982 | Wrightson | 428/425.6 |
| 4,364,786 | 12/1982 | Smith et al. | 428/425.6 |
| 4,556,600 | 12/1985 | Kraemling et al. | 428/425.6 |

FOREIGN PATENT DOCUMENTS 96551  5/1985  Japan ................................. 428/425.6

*Primary Examiner*—Edith Buffalow
*Attorney, Agent, or Firm*—Oblon, Fisher, Spivak, McClelland & Maier

[57] ABSTRACT

A transparent adhesive coating or film based on polyurethane. A polyurethane formed from at least one aliphatic or cycloaliphatic diisocyanate, at least one polyol chosen from among the polyether diols, the polycaprolactone diols, the polycarbonate diols, and the polybutadiene diols, and at least one bifunctional chain-lengthening agent containing an aromatic nucleus.

14 Claims, No Drawings

POLYURETHANE-BASED ADHESIVE COATING OR FILM, AND USE OF SAME IN LAMINATED GLASS PANES

BACKGROUND OF THE INVENTION

1. Field of the Invention

The invention relates to a polyurethane-based adhesive coating or film, and its use, in particular, as a transparent adhesive coating or film in the manufacture of laminated glass panes. More particularly, the invention relates to an adhesive coating or film based on a thermoplastic polyurethane which is resistant to moisture and is formed from moisture-insensitive polyols, aliphatic polyisocyanates, and an aromatic chain-lengthening agent.

2. Background of the Prior Art

Laminated glass panes are generally used, in particular, in motor vehicles or in architectural applications. Such panes are generally comprised of two sheets of glass and an intermediate layer comprised of a material having energy-absorbing properties, e.g., polyvinylbutyral. Recently a new type of laminated safety glass pane has been described in which the glass sheet disposed toward the interior of the vehicle is covered with a coating or sheet of a material having antilaceration and self-healing properties. The patent publications Fr. Pat. No. 2,398,606 and Eur. Pat. No. 0054491, e.g., describe such a laminated glass pane structure. The film with antilaceration and self-healing properties, which is a heat-setting polyurethane, is attached to the glass sheet by means of an adhesive layer. Fr. Pat. No. 2,398,606 cited supra describes the use of a thermoplastic polyurethane as the adhesive layer, in particular a polyurethane formed from a polyester diol. While this is generally satisfactory, this type of polyurethane loses part of its adhesiveness, and the layer can easily become turbid in severe temperature and humidity conditions, e.g., under prolonged exposure to boiling water.

SUMMARY OF THE INVENTION

The inventive adhesive coating or film is a novel type based on polyurethane. It can be employed as an adhesive coating or film in the manufacture of laminated glass panes. It preserves its transparency and adhesion even under severe temperature and humidity conditions.

The adhesive coating or film according to the invention is based on a polyurethane formed from at least one moisture-insensitive diol having molecular weight greater than 300, at least one aliphatic or cycloaliphatic diisocyanate, and at least one bifunctional chain-lengthening agent containing an aromatic nucleus.

The invention also relates to the application of the said coating or film in laminated glass panes, particularly as a transparent adhesive coating or film interposed between glass and/or plastic sheets. The invention further relates to use of such a coating or film as an adhesive for bonding the above mentioned coating or film having antilaceration and self-healing properties to a monolithic or laminated support comprised of glass or plastic material.

DETAILED DESCRIPTION OF THE INVENTION

Among the moisture-insensitive polyols which may be employed to make up the composition of the inventive polyurethane are included polyether diols such as polyoxypropylene glycols, poly(1,4-oxybutylene) glycols as well as polycarbonate polyols, polybutadiene polyols, and polycaprolactone polyols, having molecular weight between about 300 and about 3000.

The aliphatic isocyanates to form the polyurethane coating or film include the following aliphatic isocyanates: 4,4'-methylene bis(cyclohexyl) diisocyanate, trans- cyclohexane-1,4-diisocyanate, isophorone diisocyanate, hexamethylene diisocyanate, 1,3-xylylene diisocyanate, 1,4-xylylene diisocyanate, m- and p-tetramethylxylene diisocyanate, dimeryl diisocyanate menthane diisocyanate, etc.

Suitable bifunctional chain-lengthening agents containing an aromatic nucleus include aromatic diols, such as the following:

hydroquinone di(beta-hydroxyethyl) ether, 2,2'-propylidenebis(p-phenyleneoxy)di-$\omega$-2 propanol, 2,2'-propylene bis(p-phenyleneoxy) di-$\omega$2-ethanol, resorcinol bis (hydroxyethyl) ether, bis-hydroxy alkyl ether of terepthalic and isopthalic acid, etc. The preferred chain-lengthening agents are chosen from among bis (2-hydroxyethyl) hydroquinone, 2,2'-propylenebis(p-phenyleneoxy) di-$\omega$-2 propanol, and 2,2' propylene bis(p-phenyleneoxy) ethyleneoxy di-$\omega$-ethanol.

To prepare the inventive adhesive composition, a reaction is carried out between the components, preferably in a solvent medium. The "prepolymer" method may be employed, whereby the polyol is reacted with an excess of the diisocyanate to form a prepolymer, which latter is an addition product comprising free isocyanate groups. Then the chain-lengthening agent with the aromatic nucleus is added. Alternatively, one may employ the technique known as the single-stage method, whereby the polyol, the diisocyanate, and the chain-lengthening agent are mixed together directly.

The solvent used for preparing the adhesive composition in solvent medium may be, e.g., dioxane, tetrahydrofuran, cellosolve acetate, dimethylformamide, xylene, toluene, methyl ethyl ketone, methyl isobutyl ketone, ethyl acetate, or a mixture of these solvents. One may also employ alcohols, such as isopropyl alcohol, to dissolve the polymers.

Heat and/or catalysts may be used to accelerate the polymerization reaction of the polyurethane. The catalyst used may be, e.g., an organotin (e.g., dibutyltin dilaurate, tributyltin oxide, or tin octoate), an organomercury catalyst, tertiary amines such as triethylene diamine.

For the fabrication of the adhesive coating or film according to the invention, one may employ film casting of a solution of polyurethane in a solvent or a mixture of solvents. Alternatively, one may fabricate the coating or film by extrusion.

The adhesive coating or film may be formed in situ on one of the elements to be bonded; e.g., in the case where the adhesive coating or film is employed to provide adhesion of the layer having antilaceration and self-healing properties to the support, the adhesive coating or film may be formed in situ on the monolithic or laminated rigid support, or, preferably, as described infra, on the layer of plastic material having antilaceration and self-healing properties; and this forming may be carried out during a continuous fabrication process of a two-layer laminated sheet.

In this case, the two-layer laminated sheet may be fabricated as follows: First, a first layer is fabricated, which layer may either be the adhesive film according to the invention or else the sheet of self-healing plastic material formed, e.g., of a heat-setting polyurethane material. Then the second layer is formed on top of this first layer.

Alternatively, a heat-setting polyurethane sheet may be formed first, by film casting of the component mixture on a film casting support. After polymerization of the monomers and formation of a heat-setting sheet of thickness which may vary between 0.1 and 0.8 mm, a solution of the polyurethane according to the invention is molded onto this first layer by film casting. Alternatively, one may proceed in the opposite manner, i.e., first forming the adhesive polyurethane film according to the invention.

The adhesive coating or film according to the invention may be used alone as the adhesive for bonding the layer of plastic material having antilaceration and self-healing properties to the other elements of the laminated glass pane.

The adhesive coating or film according to the invention may also be used for fabricating other types of laminated glass panes, comprised of glass and/or plastic material.

Thus, the inventive adhesive coating or film may be employed for fabricating a laminated glass pane comprised of plastic material. For example, the adhesive coating or film is placed between two sheets or films of plastic material (e.g., polycarbonate, cellulose plastic, acrylic such as polymethyl methacrylate, polyvinyl chloride, polystyrene, polyethylene terephthalate, or polyurethane).

The coating or film according to the invention may also comprise additives, the purpose of which is generally to facilitate fabrication. Thus, the said coating or film may contain a coating agent such as a silicone resin or a fluoroalkyl ester.

To manufacture laminated glass panes employing the polyurethane coating or film according to one invention, the elements are bonded together with the use of pressure, e.g., by compressing the elements between the rolls of a calander; and by employing heat. Advantageously, one of the elements is precoated with the adhesive coating or film. The element thus coated may be the sheet of heat-setting material, for the case of the two-layer laminated sheet described supra.

The laminated glass pane obtained is clear, having excellent optical quality and excellent adhesion between the elements bonded by the adhesive coating or film according to the invention. These properties of transparency and adhesion are retained even under extreme conditions of temperature, moisture, and illumination, and in particular after immersion for 2 hr. in bolling water.

The invention is illustrated by the following examples.

EXAMPLE 1

A prepolymer was prepared by reaction of 1375 g (4.30 equivalents) of poly(1,4-oxybutylene) glycol of molecular weight 650 with 1083 g (13.04 equivalents) trans-1,4-cyclohexane diisocyanate at 65° C. in nitrogen atmosphere in the presence of 1.2 g dibutyltin dilaurate as a catalyst. Then, 1462 g (8.67 equivalents) of 2,2'propylidenebis(p-phenyleneoxy) di-ω-2 proponol and 436 g cellosolve acetate, as the solvent, were added to the prepolymer. After agitation, the mixture was filmcasted onto a flat glass support, and the resulting film was treated at 100° C. for 16 hr. The heat treatment caused the solvent to evaporate and resulted in chain lengthening. The film which resulted after treatment was very clear and transparent, and had excellent adhesion with the glass. Following immersion of the film and substrate in boiling water for 2 hr, the adhesion and the transparency were maintained.

For the sake of comparison, if a polyurethane is fabricated with the same components except that the chain-lengthening agent is replaced by 1,4-butanediol, the adhesive coating or film becomes turbid, and its adhesion to the support is decreased after 2 hr immersion in boiling water.

This demonstrates the advantage of employing a chainlengthening agent for manufacturing the polyurethane.

EXAMPLE 2

A prepolymer was prepared by reacting 1462 g (1.51 equivalents) poly(1,4-oxybutylene) glycol of molecular weight 2000 with 251 g (3.02 equivalents) trans-1,4cyclohexane diisocyanate at 65° C. under nitrogen atmosphere in the presence of 2.4 g dibutyltin dilaurate as a catalyst. 287 g (1.43 equivalents) 2,2'-propylene bis[(p-phenyleneoxy)ethyleneoxy]di-ω-2-ethanol and 2000 g cellosolve acetate were added to the prepolymer. After mixing, the composition was film-cast to form a film on a flat glass support, and the film and support together were treated at 100° C. for 16 hr.

The resulting film had excellent optical quality and excellent adhesion to the glass support. These properties were maintained even after 2 hr in boiling water.

EXAMPLE 3

250 g (1.48 equivalents) of 2,2'-propylidenebis(p-phenyleneoxy) di-ω-2 propanol) and 200 g cellosolve acetate were added to the prepolymer of Example 2. The film obtained by film casting of the composition on a glass support had excellent optical quality and excellent adhesion to the glass. These properties were maintained after immersion for 2 hr in boiling water.

EXAMPLE 4

A prepolymer was prepared by reacting 1372 g (1.42 equivalents) 2,2'-propylidenebis[(p-phenyleneoxy)-ethyleneoxy]di-ω-2-ethanol with poly(1,4-oxybutylene) glycol of molecular weight 2000, and 369 g (3.81 equivalents) 4,4'-methylenebis(cyclohexyl) diisocyanate at 65° C. under nitrogen atmosphere in the presence of 36 g dibutyltin dilaurate as a catalyst. 258 g (1.29 equivalents) of D-22 and 2000 g cellosolve acetate were added to the resulting prepolymer. The film obtained after film casting of the composition on a glass support had excellent optical quality and excellent adhesion to the glass. These properties were maintained after immersion for 2 hr in boiling water.

EXAMPLE 5

A prepolymer was prepared by reaction of 1646 g (5.14 equivalents) poly(1,4-oxybutylene) glycol of molecular weight 650 with 850 g (10.28 equivalents) trans-1,4-cyclohexane diisocyanate at 65° C. under nitrogen atmosphere in the presence of 3.6 g dibutyltin dilaurate as a catalyst. 865 g (5.31 equlvalants) 2,2'propylidenebis(p-phenyleneoxy) di-ω-2-proponol) and 748 g cellosolve acetate were added to the resulting prepolymer. The film obtained after film casting of the composition on a glass support had excellent optical quality and excellent adhesion to the glass. These properties were maintained after immersion for 2 hr in boiling water.

EXAMPLE 6

A prepolymer was prepared by reaction of 2177 g (4.50 equivalents) poly(1,4-oxybutylene) glycol of molecular weight 1000 with 747 g trans-1,4-cyclohexane diisocyanate at 65° C. under nitrogen atmosphere in the presence of 36 g dibutyltin dilaurate as a catalyst. 6.37 g (3.78 equivalents 2,2'-propylidenebis(p-phenyleneoxy) phenyleneoxy) di-ω-propanol and 698 g cellosolve acetate were added to the prepolymer. The film obtained after film casting of the composition on a glass support had excellent optical quality and excellent adhesion to the glass. These properties were maintained after immersion for 2 hr in boiling water.

EXAMPLE 7

A prepolymer was prepared by reacting 1646 g (5.14 equivalents) of poly(1,4-oxybutylene) glycol of molecular weight 650 with 854 g (10.28 equivalents) trans-1,4cyclohexane diisocyanate at 80° C. under nitrogen atmosphere, in the presence of 3.6 g dibutyltin dilaurate as a catalyst. 865 g (5.13 equivalents) of 2,2'-propylidenebis(p-phenyleneoxy) di-ω-2-propanol was added to the prepolymer, which was maintained at 80° C. After agitation, the mixture was poured onto a polypropylene sheet and was spread out in normal fashion. The coated sheet was held at 80° C. for 16 hr, to complete the polymerization. The resulting polyurethane was dissolved in a 1:1 mixture of methyl ethyl ketone and dioxane until a dilution of 10 wt. % dry matter was achieved. The solution was then applied to a flat glass support by film casting, and the solvent was removed by evaporation, by passing through a furnace at 100° C. for 1 hr. With this technique, the polyurethane was completely polymerized before film casting to form a film. This allows the coating or film to be fabricated on a production line. The resulting film was transparent, and had good adhesion to the glass. It retained its properties after being immersed 2 hr in boiling water.

EXAMPLE 8

The final polyurethane produce of Example 7 was dissolved in a 1:1 mixture of tetrahydrofuran and dioxane, to a dilution of 8.5 wt. % dry matter. The film obtained after film casting of the composition on a glass support had excellent optical quality and excellent adhesion to the glass. These properties were maintained after immersion for 2 hr in boiling water.

EXAMPLE 9

A prepolymer was prepared by reacting 1646 g (5.14 equivalents) of poly(1,4-oxybutylene) glycol having molecular weight 650 with 854 g (10.28 equivalents) trans-1,4- cyclohexane diisocyanate, in the presence of 3.6 g dibutyltin dilaurate as a catalyst. The prepolymer was dissolved in a 1:1 mixture of toluene and methyl ethyl ketone, to a dilution of 25 wt. % solid matter. 865 g (5.13 equivalents) 2,2'-propylidenebis-(p-phenyleneoxy) di-ω-2-propanol was added to this solution. The solution was agitated at 80° C. under nitrogen atmosphere until the chain lengthening was completed. Absence of free isocyanates was determined by a titration method employing di-n-butylamine. The solution was applied onto a flat glass support by film casting, and the solvent was evaporated by heating the film at 100° C. for 1 hr. The film obtained after film casting of the composition on a glass support had excellent optical quality and excellent adhesion to the glass. These properties were maintained after immersion for 2 hr in boling water. With the technique described, the polyurethane is complete polymerized in solution before film-casting.

EXAMPLE 10

A prepolymer was prepared by reacting 1462 g (14.56 equivalents) of poly(1,4-oxybutylene) glycol having molecular weight 2000 with 256 g (3.08 equivalents) trans-1,4cyclohexane diisocyanate, in the presence of 3.6 g dibutyltin dilaurate as a catalyst. The prepolymer was then dissolved in a 1:1 mixture of toluene and methyl ethyl ketone, to a dilution of 25 wt. % dry matter. 250 g (1.48 equivalents) 2,2'-propylidenebis(p-phenyleneoxy) di-ω-2-propanol was added to this solution. The chain lengthening was carried out as in Example 9. The film obtained after film casting of the composition on a glass support had excellent optical quality and excellent adhesion to the glass. These properties were maintained after immersion for 2 hr in boiling water.

EXAMPLE 11

The polyurethane for this Example was obtained in solution, in a single stage process. 5454 g (17.04 equivalents) poly(1,4-oxybutylene) glycol having molecular weight 650 was mixed with 1129 g (11.39 equivalents) bis (2-hydroxyethyl) hydroquinone. The mixture was dissolved to form a 75% solution by addition of 3330 g dimethylformamide at 90° C. under nitrogen atmosphere. Then 3417 g (26.04 equivalents) 1,4'-methylenebis(cyclohexyl) diisocyanate preheated to 90° C. was added. After agitation for 1 min, 4 g dibutyltin dilaurate was added under agitation. The mixture was continuously stirred at 90° C. until an increase in viscosity was obtained. The mixture was diluted to 50% dry matter by addition of 667 g DMF (dimethylformamide). After agitation and degassing under vacuum, the mixture was heated to 90° C. under nitrogen atmosphere until the reaction was completed. Completion was determined by a 0% isocyanate content. The mixture was spread onto a polypropylene sheet, and the DMF was reduced by evaporation at 80° C. for 24 hr. The resulting polyurethane was dissolved in a 1:1 mixture of tetrahydrofuran and methyl ethyl ketone, to a dilution of 10 wt. % dry matter.

This solution was then subjected to film casting to form a film of thickness approximately 0.02 mm on a first film of thickness approximately 0.02 mm of heat-setting polyurethane obtained in the following manner:

Onto a glass support coated with a release agent, said agent being, e.g., that described in Fr. Pat. No. 2,383,000, namely a modified addition product of ethylene oxide, a homogeneous mixture was applied, by the technique of film casting, said mixture having the following composition:

1000 g of a polyether having molecular weight about 450, obtained by condensing epoxypropane with 2,2bis(hydroxymethyl)-1-butanol and having a content of free hydroxyl groups of about 10.5–12%, and further containing 1 wt. % of a stabilizer, 0.05 wt. % of a catalyst (dibutyltin dilaurate), and 0.1 wt. % of a coating agent; and 1020 g of a biuret of 1,6-hexane diisocyanate having a content of free isocyanate groups of about 23.2%.

The casting head employed was one such as described in Fr. Pat. No. 2,347,170. A uniform film was formed which, after polymerization under heating (e.g., at 120° C. for about 15 min), had a thickness of about 0.3 mm, and showed selfhealing properties.

After the film-casting of the second polyurethane film, the two-layer film was heated to 100° C. for 30 min.

The two-layer film was then bonded to a glass support, by calandering followed by an autoclave cycle.

The resulting pane had excellent optical quality and perfect transparency.

The adherence between the glass sheet and the polyurethane film was measured by a peeling test as follows, performed on the fabricated pane:

A strip 5 cm wide was cut from the sheet coated with the two films. The end of the strip was separated, and tension was exerted perpendicularly to the surface of the pane, using a pulling speed of 5 cm/min. The test was carried out at 20° C. The mean tension force required to separate the strip was recorded. The result was 10 dN/cm.

The properties of transparency and adhesion were maintained after immersion of the pane for 2 hr in boiling water.

When the two-layer film prepared according to the present Example was combined with a laminated glass support formed from two sheets of glass and having an intermediate film of, e.g., polyvinyl butyral, the result was a safety glass pane having antilaceration and selfhealing properties and being useful in particular, for vehicle windows and the like.

EXAMPLE 12

The procedure was the same as in Example 11, except that the polyol employed was poly(1,4-oxybutylene) glycol having molecular weight 1000. 6176 g (12.76 equivalents) of this polyol was mixed with 876 g (8.84 equivalents) bis(2-hydroxyethyl) hydroquinone and dissolved in 3330 g DMF. Then, 2945 g 1,4′-methylenebis(cyclohexyl) diisocyanate was added. The remainder of the procedure was as in Example 11. The result was a transparent laminated pane. The peeling test on this pane yielded a value of 16 dN/5cm.

These properties were not affected by immersion for 2 hr in boiling water

EXAMPLE 13

5454 g (17.04 equivalents) poly(1,4-oxybutylene) glycol having molecular weight 650 was mixed with 1129 g bis(2-hydroxyethyl) hydroquinone at 90° C., in 300 g dioxane. Then 4 g dibutyltin dilaurate was added, followed by 3417 g 4,4′methylenebis(cyclohexyl) diisocyanate. The mixture was heated at 100°–110° C., under reflux and agitation, under nitrogen atmosphere, until completion of the reaction, which completion was determined by detection of zero isocyanate. After cooling to 50° C., the solution was diluted to a dilution of 10% solid matter, by addition of 3000 g methyl ethyl ketone and 3000 g tetrahydrofuran. The composition was then applied to a flat glass support, by film casting. The film obtained had excellent optical quality and excellent adhesion to the glass. These properties were maintained after immersion for 2 hr in boiling water.

EXAMPLE 14

The procedure was the same as in Example 13, except that the polymerization was carried out in solution in a mixture of 15,000 g dioxane and 15,000 g xylene. The final film obtained had identical characteristics to those obtained supra.

EXAMPLE 15

6176 g (12.76 equivalents) poly(1,4-oxybutylene) glycol having molecular weight 1000 was mixed with 876 g (8.84 equivalents) bis (2-hydroxyethyl) hydroquinone at 90° C., in 30,000 g dioxane. 4 g dibutyltin dilaurate was added, followed by 2945 g 4,4′methylenebis(cyclohexyl) diisocyanate. The mixture was heated under reflux at 100°–110° C., with agitation, under nitrogen atmosphere, until the reaction was completed. After cooling to 50° C., 30,000g methyl ethyl ketone and 30,000 g tetrahydrofuran were added to reduce the concentration of the solution to 10 wt. % dry matter. The composition was applied to a flat glass support by film casting, and the combination of support and film was heated to 100° C. for 1 hr. The film obtained had excellent optical quality and excellent adhesion to the glass. These properties were maintained after immersion for 2 hr in boiling water.

EXAMPLE 16

7605 g (7.86 equivalents) of poly(1,4-oxybutylene) glycol having molecular weight 2000 was reacted with 548 g bis(2-hydroxyethyl) hydroquinone in 30,000 g dioxane at 90° C. 4 g dibutyltin dilaurate was added, followed by 1845 g 4,4′-methylenebis(cyclohexyl) diisocyanate. The solution was heated to 100°–110° C. under reflux, under nitrogen, until the reaction was completed. After cooling to 50° C., the solution was diluted to 10% by addition 30,000 g methyl ethyl ketone and 30,000 g tetrahydrofuran. The composition was applied to a flat glass support by film casting, and was heated to 100° C. for 1 hr. The film obtained had excellent optical quality and excellent adhesion to the glass. These properties were maintained after immersion for 2 hr in boiling water.

EXAMPLE 17

The procedure was as described in Example 11, except that instead of bonding the resulting two-layer film to a glass support, a support comprised of a plastic material was employed, with the plastic material being a material such as polycarbonate, polymethyl methacrylate, cellulose acetate, cellulose acetobutyrate, polyvinyl chloride, polystyrene, polyester, or polyurethane. In all these cases, a pane of good optical quality resulted.

Obviously, numerous modifications and variations of the present invention are possible in light of the above teachings. It is therefore to be understood that within the scope of the appended claims, the invention may be practiced otherwise than as specifically described herein.

What is claimed and as new and desired to be secured by letters patent of the United States is:

1. A transparent adhesive polyurethane-based coating or film usable in laminated glass panes;
   wherein the polyurethane is formed from at least one aliphatic or cycloaliphatic diisocyanate, at least one polyol chosen from among the polyether diols, the polycaprolactone diols, the polycarbonate diols, and the polybutadiene diols, and at least one bifunctional chain-lengthening agent containing an aromatic nucleus.

2. A transparent adhesive coating or film according to claim 1;
   wherein the diisocyanate is chosen from among 4,4′methylenebis(cyclohexyl) diisocyanate, trans- 1,4-cyclohexane diisocyanate, isophorone diisocyanate, hexamethylene diisocyanate, and dimeryl diisocyanate.

3. A transparent adhesive coating or film according to claim 2; characterized in that the diisocyanate is chosen from among trans-1,4-cyclohexane diisocyanate and 4,4'-methylenebis(cyclohexyl) diisocyanate.

4. A transparent adhesive coating or film according to claim 1 wherein the polyol is a polyether diol chosen from among the poly(1,4-oxybutylene)diols and the poly(oxypropylene)diols.

5. A transparent adhesive coating or film according to claim 4; wherein the polyol is poly(1,4 oxybutylene) glycol.

6. A transparent adhesive coating or film according to claim 1 wherein the polyol has a molecular weight between 300 and 3000.

7. Transparent adhesive coating or film according to claim 1 wherein the aromatic chain-lengthing agent is a diol chosen from the group consisting of bis (2-hydroxyethyl) hydroquinone, 2,2'-propylidenebis (p-phenyleneoxy) di-ω-2-propanol, 2,2'resorcinol propylene bis [(p-phenyleneoxy) ethyleneoxy]di-ω-ethanol and the bis-hydroxyalkyl ethers of terephthalic and isophthalic acid.

8. A transparent adhesive coating or film according to claim 7 wherein the chain-lengthening agent is a diol chosen from among the following: bis (2-hydroxyethyl) hydroquinone, 2,2'-propylidenebis(p-phenyleneoxy) di-ω-2-propanol and 2,2'propylene bis [(p-phenyleneoxy-ethyleneoxy]di-ω-ethanol.

9. A laminated glass pane comprising an adhesive coating or film according to one of claim 1.

10. A laminated glass pane according to claim 9 wherein the adhesive coating or film is disposed between two glass sheets.

11. A laminated glass pane according to claim 9; wherein the adhesive coating or film is disposed between a glass sheet and a sheet comprised of plastic material.

12. A laminated glass pane according to claim 11; wherein the adhesive coating or film is disposed between a glass sheet and a sheet of plastic material, said sheet of plastic material comprising a heatsetting polyurethane material having antilaceration and self-healing properties.

13. A laminated glass pane according to claim 9; wherein the adhesive coating or film is disposed between two sheets, coatings, or films, of plastic material, which material is chosen from the group consisting of polycarbonate, cellulose plastic, acrylic such as polymethyl methacrylate, polyvinyl chloride, polystyrene, polyethylene terephthalate, and polyurethane.

14. A transparent sheet of plastic material of high optical quality, employed in the manufacture of laminated glass panes and comprised of two layers, one of which layers is comprised of plastic material having antilaceration and self-healing properties, comprised of a heat-setting polyurethane, and the other is comprised of plastic material having adhesive properties; characterized in that the layer of plastic material having adhesive properties is the adhesive coating or film according to claim 1.

* * * * *